March 29, 1955   M. G. BECK   2,705,118
MOUNTING SYSTEM
Filed Jan. 30, 1952

INVENTOR.
Merrill G. Beck
BY Ralph Hammar
Attorney ent Office
2,705,118
Patented Mar. 29, 1955

2,705,118

MOUNTING SYSTEM

Merrill G. Beck, Erie, Pa., assignor to Lord Manufacturing Company, Erie, Pa., a corporation of Pennsylvania Application January 30, 1952, Serial No. 269,096

2 Claims. (Cl. 248—10)

This invention is a resilient mounting system in which an incompressible liquid is used to block or restrain movement of a pair of mountings in one direction so as to obtain a relatively low degree of freedom as compared to some other direction. Each of the mountings has a supporting and supported member connected by a load-carrying spring connection and further has walls defining a liquid tight chamber of volume directly related to the relative position of the supporting and supported members. In the mounting system, a pair of mountings have their liquid chambers connected by a conduit. When the forces on the individual mountings are in the direction to expand the chamber of one of the mountings and to contract the chamber of the other, the liquid offers only the restraint determined by the friction of transfer through the connecting conduit. On the other hand, when the forces on the individual mountings are in the direction to contract the respective chambers, then because of the incompressibility of the liquid, the mountings are both rigid. By way of example, the mounting system may be essentially rigid in translation and flexible in torque, or vice versa.

Figure 1:
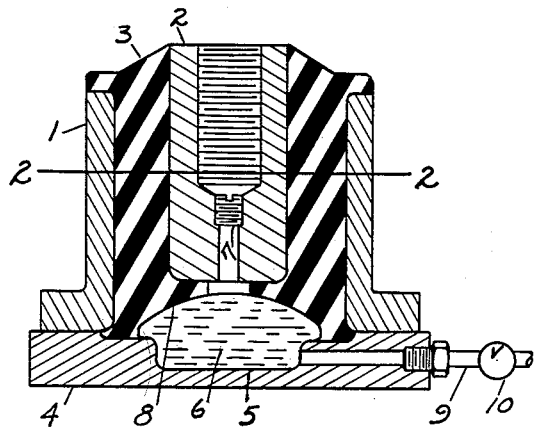
Figure 2:
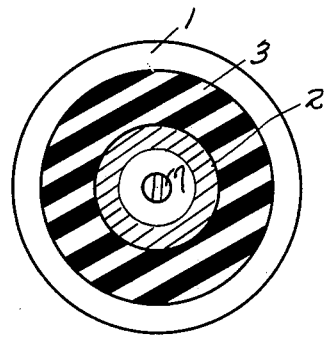
Figure 4:
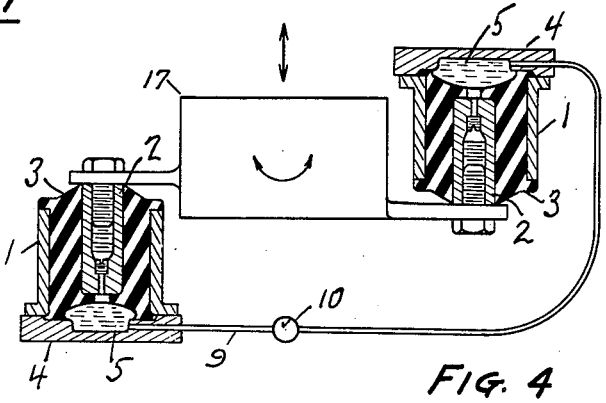
Figure 3:
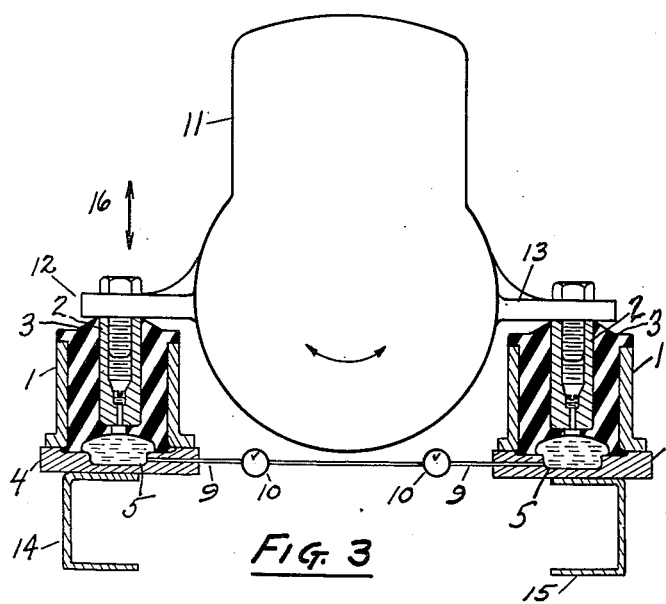

In the accompanying drawing, Fig. 1 is a sectional elevation of an individual mounting; Fig. 2 is a section on line 2—2 of Fig. 1; Fig. 3 is a diagrammatic view of an engine mounting installation arranged to flexibly support the engine as to torque vibrations and to rigidly support the engine as to vertical translational vibrations; and Fig. 4 is a diagrammatic view of another mounting system arranged to be rigid in torque and resilient in vertical translation.

In Figs. 1 and 2 there is shown one of the mountings forming part of the mounting system. The individual mounting comprises supporting and supported members 1 and 2 between which is bonded a body 3 of a resilient elastomer such as rubber. The elastomer is arranged so that the load between the members 1 and 2 is carried in shear, but it could be arranged so as to be differently stressed. The member 1 has fixed thereto a closure plate 4 which, in conjunction with the lower end of the body 3 and of the member 2, forms a chamber 5 filled with a liquid 6. As the members 1 and 2 move relative to each other under a vibratory load, there is an approach and recession of the walls of the chamber 5 which expands and contracts the volume. Since all liquids are relatively incompressible, a contraction in the volume of the chamber to less than the volume of the liquid therein contained would be essentially impossible. A removable filler plug 7 in the member 2 is provided for filling the chamber and for venting air from the chamber. The liquid most suitable for filling the chambers is hydraulic brake fluid. With the mounting in the position shown in Fig. 1, a vertical load applied to the member 2 would deflect the rubber in shear toward the plate 4 and cause the lower edge 8 of the rubber to approach the plate 4 and decrease the volume of the chamber 5. If the mounting were inverted, a load suspended from the member 2 would stress the rubber in shear in the opposite direction and would tend to increase the volume of the chamber 5. Whether the mounting is in the position illustrated in Fig. 1, or in the inverted position, the shear resistance of the rubber 3 is essentially the same, the primary difference being in the sense in which the volume of the chamber 5 changes.

The mountings shown in Figs. 1 and 2 are used as part of a mounting system where two or more of the mountings work in conjunction. For this purpose there is provided a conduit 9 communicating with the chamber 5 and controlled by a valve 10. The valve 10 provides an adjustable restriction for the flow of liquid through the conduit 9.

In Fig. 3 there is shown an engine mounting system where it is desired that the engine have a high degree torsional freedom, but be rigidly supported in translation. The rigidity of support in a translation direction is desirable in automotive vehicles where the translational frequency of the engine support should be above the tire frequencies. In this mounting system, two of the mountings shown in Fig. 1 are used to support an engine 11. The mountings are arranged on opposite sides of the torque axis of the engine between brackets 12 and 13 on the engine and side frames 14 and 15 on the vehicle. In each case, the cover plate 4 for the mounting chamber 5 rests on the side frame. The conduits 9 of the mounting are directly connected. With this arrangement, vertical vibrations in the direction of arrow 16 tend to contract and expand the chambers 5 of the respective mountings in the same direction. Since these chambers are directly connected through the conduits 9 and the liquid filling is incompressible, this provides an essentially rigid support insofar as vertical translation is concerned. With this arrangement there is also an essentially rigid support insofar as horizontal translation is concerned, because the body of rubber 3 is arranged between concentric inner and outer members 1 and 2 and is accordingly stressed in compression. On the other hand, torsional vibration can be very little restrained by the change in volume of the liquid chambers 5 of the mountings. When the mounting at one side of the torque axis is moving downward, the mounting at the other side is moving upward so that the respective liquid containing chambers change volume in an opposite sense and the change in volume of one of the mountings is compensated by the change in volume of the other. This arrangement means that the torsional resilience of the mounting system is due almost entirely to the resilience of the rubber body 3. If it is desirable to introduce any frictional damping insofar as torsional vibrations are concerned, this can be conveniently accomplished by setting the valves 10 to interpose the desired resistance to the back and forth flow of liquid through the connected conduits 9.

In Fig. 4 there is shown a mounting system in which a low degree of freedom is desired for vibrations in a torsional direction, while a high degree of freedom is desired in translation. One use for such a system is in the supporting of reduction gear boxes 17 which are subject to heavy torque loads, but which nevertheless should be resiliently supported insofar as translational vibrations are concerned. This result is accomplished by arranging a pair of the mountings shown in Figs. 1 and 2 on opposite sides of the torque axis of the gear box 17 and in inverted relation with respect to each other. With this arrangement, under torsional movement of the gear box 17 which would tend to move one side up and the other side down, the pair of mountings form an essentially rigid support. On the other hand, under vertical translation, where both sides of the gear box 17 move simultaneously in the same direction, one of the mountings has its liquid filled chamber contracted at the same time the other mounting has its liquid filled chamber expanded so that the relative changes in volume of the liquid filled chambers compensate each other and the only restraint offered to vertical translation insofar as the liquid is concerned is the adjustable friction offered by the valve 10 to the flow through the connected conduits 9. The primary action of the mountings insofar as vertical translation is concerned is due to the resilience of the rubber.

What is claimed as new is:

1. A resilient mounting system for a body to be supported with a low degree of freedom in the torque direction and a high degree of freedom in a translation direction comprising a pair of mountings located on opposite sides of the torque axis of the body so as to be subjected to stress in opposite directions as an incident to torque vibration and to stress in the same direction as an incident to translation, each mounting comprising a supporting and supported member with an intermediate load carrying spring connection, one of the members being an outer member having outer continuous rigid side and end walls and the other of the members being an inner member located within and spaced from said outer rigid walls, a body of resilient material bridging the space between the inner member and the side walls of the outer member and forming a resilient load carrying connection between the members resisting movement of the members relative to each other under stress applied to the supporting member, the body being constructed to provide a chamber between the inner member and the end wall of the outer member which varies in volume as the inner member moves toward and away from the end wall, and a liquid completely filling the chambers, and a conduit completely filled with liquid connecting the chamber of one mounting with the chamber of the other mounting, said mountings being oriented in opposite directions so that upon simultaneous stress of the resilient material of the mountings in opposite directions as an incident to torque vibration the volumes of the respective chambers tend to change in the same direction and the incompressibility of the liquid resists torsional disturbances, whereas upon simultaneous stress of the resilient material of the mountings in the same direction as an incident to translation, the change in volume of one of the chambers is compensated by a corresponding change in opposite sense of the other chamber.

2. A resilient mounting system for a body to be supported with a low degree of freedom in the torque direction and a high degree of freedom in a translation direction comprising a pair of mountings located on opposite sides of the body so as to be subjected to stress in opposite directions as an incident to torque vibration and to stress in the same direction as an incident to translation, each mounting comprising a supporting and a supported member with an intermediate load carrying body of resilient elastomer bonded thereto and including spaced continuous rigid walls on the respective members confining the elastomer therebetween with a portion of the elastomer having an exposed surface extending transverse to the direction of the relative movement of the supporting and supported members under stress and another rigid wall connected to one of said members and spaced from and in opposed relation to said exposed surface of the elastomer and from the other of said members and defining in conjunction with said exposed surface of the elastomer a chamber having a volume dependent upon the spacing of said other member from said other rigid wall, and a liquid completely filling the chambers, and a conduit completely filled with liquid connecting the chamber of one mounting with the chamber of the other mounting, the supporting members of said mountings being connected to the body to be supported and the supporting members of said mountings being connected to a supporting structure and said mountings being oriented in opposite directions so that upon simultaneous stress of the bodies of resilient elastomers in opposite directions as an incident to torque vibration the volumes of the respective chambers tend to change in the same direction and the incompressibility of the liquid resists torsional disturbances, whereas upon simultaneous stress of the bodies of resilient elastomers in the same direction as an incident to translation, the change in volume of one of the chambers is compensated by a corresponding change in opposite sense of the other chamber.

References Cited in the file of this patent

UNITED STATES PATENTS

| | | |
|---|---|---|
| 1,949,064 | Nathan | Feb. 27, 1934 |
| 2,038,968 | Summers | Apr. 28, 1936 |
| 2,457,749 | Thiry | Dec. 28, 1948 |

FOREIGN PATENTS

| | | |
|---|---|---|
| 695,881 | Germany | Sept. 5, 1940 |